United States Patent [19]
Sawada et al.

[11] 3,851,992
[45] Dec. 3, 1974

[54] GROOVING MACHINE TOOL

[75] Inventors: Kingo Sawada, Kariyashi; Masaaki Mizuno, Kariya; Mabayoshi Ogihara, Nagoya, all of Japan

[73] Assignee: Toyoda Koki Kabushiki Kaisha, Aichi-ken, Japan

[22] Filed: June 13, 1973

[21] Appl. No.: 369,484

[30] Foreign Application Priority Data
June 13, 1972 Japan.............................. 47-58257

[52] U.S. Cl............................ 408/54, 90/31, 408/71
[51] Int. Cl............................................. B23b 41/00
[58] Field of Search............ 408/54, 71, 90; 90/30, 90/31, 78, 92

[56] References Cited
UNITED STATES PATENTS
3,771,894  11/1973  Happy.................................. 408/54
3,778,178  12/1973  Hunkeler............................. 408/54

FOREIGN PATENTS OR APPLICATIONS
1,269,455  5/1968  Germany.............................. 408/54

*Primary Examiner*—Francis S. Husar
*Attorney, Agent, or Firm*—Oblon, Fisher, Spivak, McClelland & Maier

[57] ABSTRACT

A grooving machine tool used for automatically forming arcuate grooves required on a plurality of workpieces which are releasably clamped on an index table, in which each of the workpieces is successively, in order, indexed into a machining position where each is revolved about the axis thereof through a predetermined angle in accordance with one revolution of a tool holder. While the tool holder is rotated one revolution, the arcuate groove to be formed on the workpiece is placed in the machining position and thereafter, finished by means of a series of cutting tools which are consecutively projected a predetermined amount from the tool holder by control means.

10 Claims, 6 Drawing Figures

GROOVING MACHINE TOOL

BACKGROUND OF THE INVENTION

1. Field of the Invention

The present invention relates generally to a grooving machine tool, and more particularly to an improved machine tool for successively forming arcuate grooves on a plurality of workpieces.

2. Description of the Prior Art

In the past, workpieces, such for example as the rotors for a rotary internal combustion engine are clustered on a rotatable fixture so that the apexes of the rotors meet at a corner and a cutting tool forms a first arcuate groove parallel to and along the peripheral edge of each rotor by rotation of the rotatable fixture.

When the first groove has been formed on each of rotors, using conventional devices the same must be manually repositioned on the rotatable fixture and thereafter, the second groove can be formed thereon in a similar manner as the first groove. In this manner, each of the grooves are formed on the rotors after manual repositioning, and thus, an extensive amount of time is required to complete a plurality of rotors. Furthermore, the machine operator is inevitably required to perform more work than is desired.

Therefore, conventional machines have not been found to be entirely satisfactory for the industry, particularly for the automobile industry in which mass production is the most essential and desirable requirement.

SUMMARY OF THE INVENTION

Accordingly, it is an object of the present invention to provide a new and improved grooving machine tool.

Another object of the present invention is to provide a grooving machine tool wherein arcuate grooves having a predetermined radius of curvature on a plurality of workpieces can be successively and efficiently machined without any interruption by means of a tool holder having a series of cutting tools.

Still another object of the present invention is to provide a grooving machine tool in which a plurality of workpieces are indexed in synchronized relation to the rotation of a tool holder.

Still a further object of the present invention is to provide a grooving machine tool wherein each of workpieces to be machined is successively positioned into a machining position one after another in regular succession and the workpiece is rotated around the axis of a work spindle and simultaneously rotated about its own axis.

Yet a further object of the present invention is to provide a grooving machine tool in which each of a series of cutting tools which is arranged on a tool holder is automatically projected in consecutive order from or retracted into the tool holder by a predetermined desirable amount.

The foregoing and other objects are attained through the provision of a grooving machine tool according to the present invention, wherein a plurality of workpieces which are fixedly mounted on an index table at a predetermined angular separation are successively indexed into a predetermined machining position, and are revolved about the axis of the same together with the rotation of the index table in accordance with one revolution of a tool holder so as to automatically machine required arcuate grooves on each workpiece. In addition, the arcuate groove to be formed on the workpiece is finished by means of a series of cutting tools which are held on the tool holder and automatically controlled with respect to the amount projected therefrom while the tool holder is rotated by one revolution thereof.

BRIEF DESCRIPTION OF THE DRAWINGS

Various other objects, features and attendant advantages of the present invention will now be more fully appreciated as the same becomes better understood from the following detailed description when considered in connection with the accompanying drawings, when like reference characters designate like or corresponding parts throughout the several views and in which.

DETAILED DESCRIPTION OF A PREFERRED EMBODIMENT

The preferred embodiment of a grooving machine tool according to the present invention will now be described so as to form three pairs of arcuate grooves for compression seals on the flat end-face of a rotor which is utilized in a rotary internal combustion engine.

Figure 1:
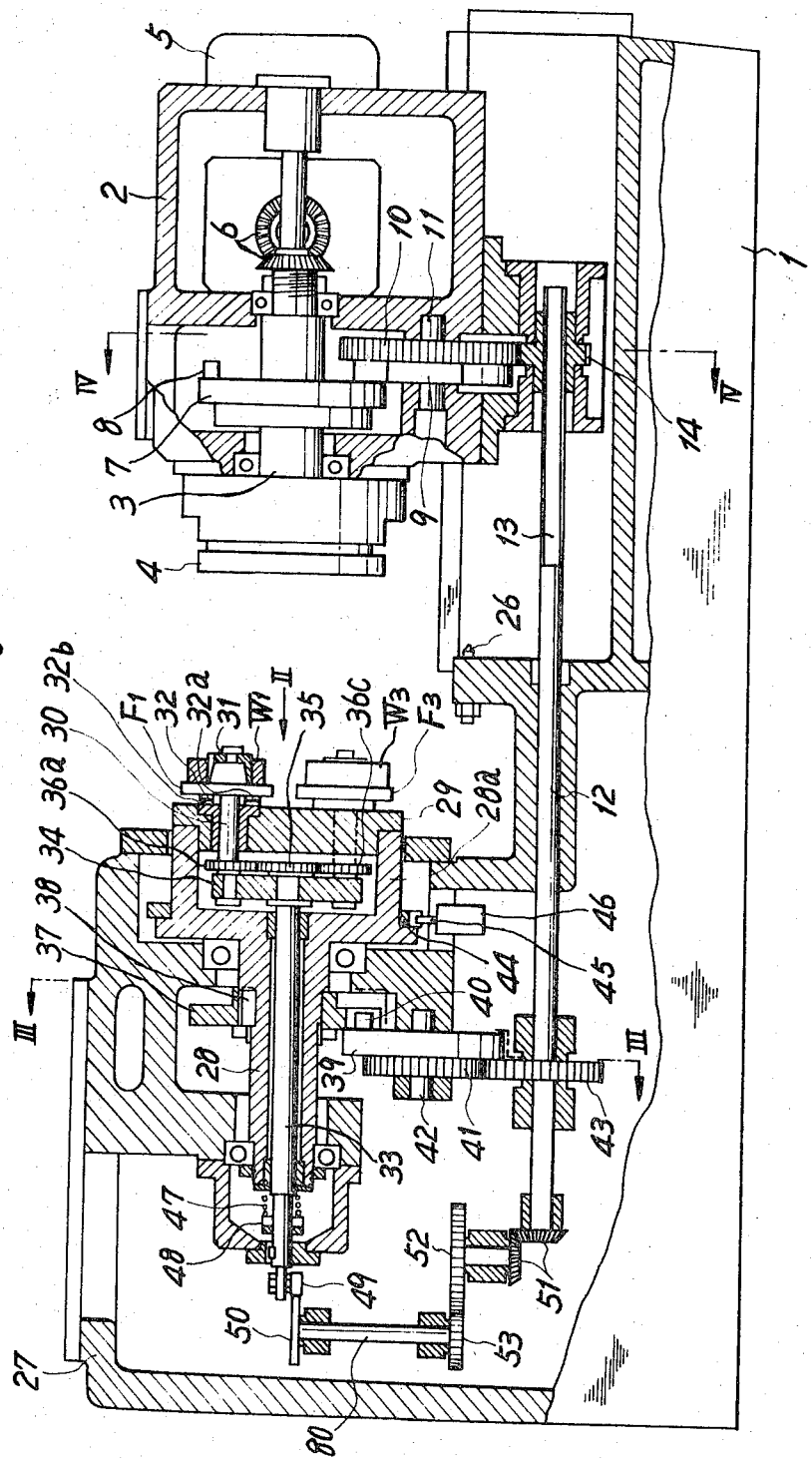
FIG. 1 is a cross-sectional elevation showing a preferred embodiment of a grooving machine tool according to the present invention.

Referring now to the drawings, and more particularly to FIG. 1 thereof, the reference numeral 1 designates generally a base on which a spindle head 2 is longitudinally traversed by means of a feeding device, not shown. A tool spindle 3 is rotatably supported in the spindle head 2 and rotated through bevel gears 6 by a drive motor 5. Integrally formed with the tool spindle 3 at the left end thereof is a tool holder 4 on which a series of cutting tools is held by means of appropriate control means as explained in more detail later. A rotatable plate 7 is integrally connected with the tool spindle 3, having a pin 8 projecting therefrom.

Figure 4:
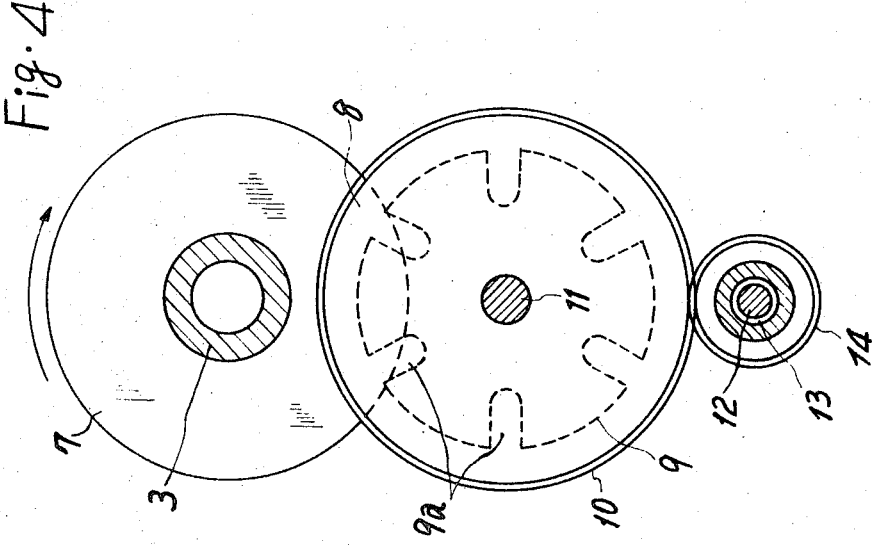
FIG. 4 is an enlarged cross-sectional view taken along the line IV—IV in FIG. 1.
Figure 3:
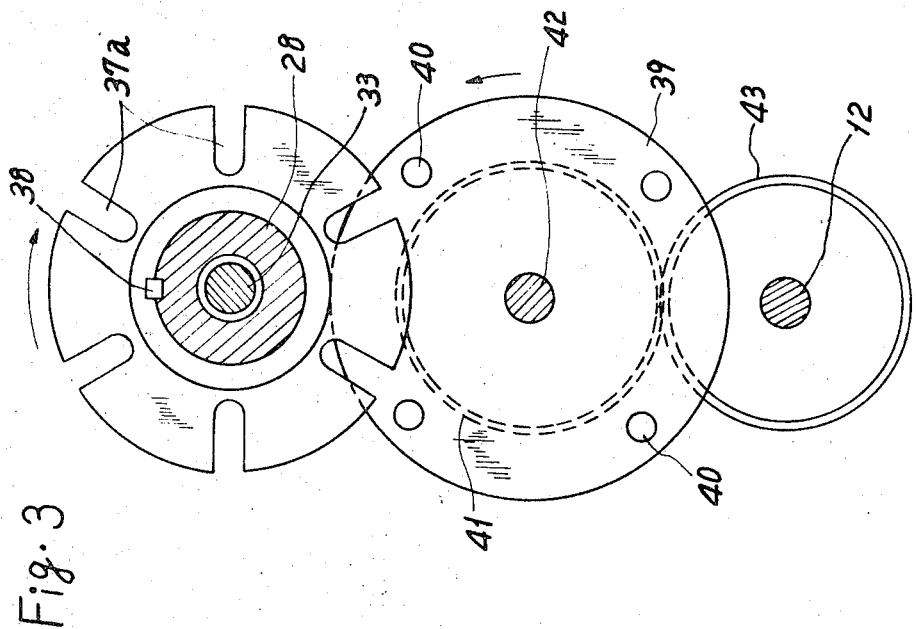
FIG. 3 is an enlarged cross-sectional view taken along the line III—III in FIG. 1.

An external geneva gear indicated by the reference numeral 9 is rotatably mounted on a rotating shaft 11 in parallel relation to the axis of the tool spindle 3 at the lower portion of the spindle head 2. There is provided a spur gear 10 which is incorporated together with the external geneva gear 9 in a body. The external geneva gear 9 is provided with six engaging grooves 9a which are 60° apart from each other, as shown in FIG. 4. Therefore, when the rotatable plate 7 on the tool spindle 3 is rotated by one revolution thereof, the external geneva gear 9 is rotated through an angle of 60° by way of the engagement between the pin 8 and one of the engaging grooves 9a, thereby permitting movement of the spur gear 10 through the same angle.

A gear 14 is meshed with the spur gear 10 and is further slidably mounted on a spline 13 which is formed on a synchronizing shaft 12 at the right end portion thereof. The gear ratio between the gears 10 and 14 is 3 to 1. That is, when the spur gear 10 is rotated through an angle of 60°, the synchronizing shaft 12 is rotated through an angle of 180°.

The construction of the tool holder 4 will be described in detail with reference to FIGS. 2, 5 and 6.

A series of cutting tools 15 which consist of cutters 15a to 15t for rough machining operations and a cutting tool 16 for a fine machining operation are disposed circumferentially and equidistantly around the periphery of the tool holder 4. However, the cutting tool 16 is spaced apart a predeterminate distance from the series of cutting tools 15. The cutting tools 15 and 16 are axially slidable within the tool holder 4 and are prevented from rotation by engagement of a recessed guide way 55 formed with a projection 54 therein. The projection 54 is securedly provided in the tool holder 4 so as to allow axial movement of each of the cutting tools 15 and 16; the stroke of movement being a predetermined distance $l$ as shown in FIG. 5.

Figure 5:
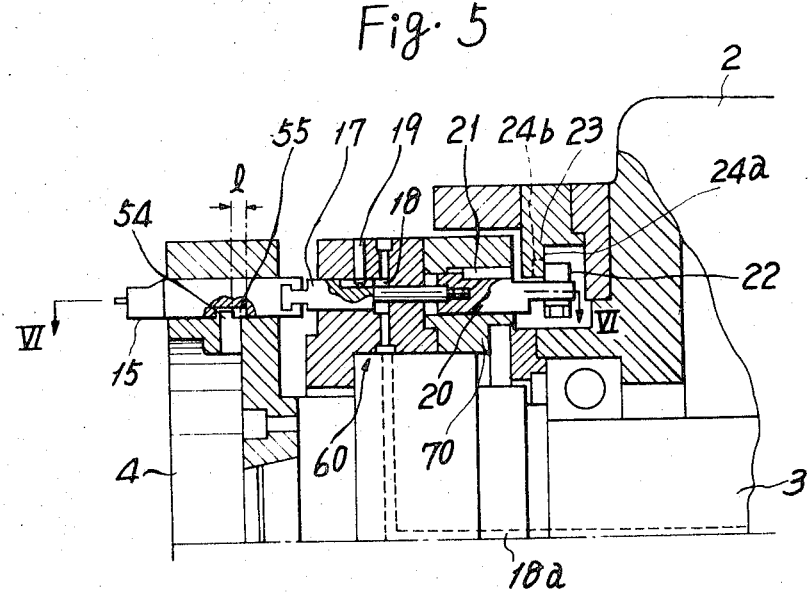
FIG. 5 is a cross-sectional view partly showing a tool holder of the present invention.
Figure 6:
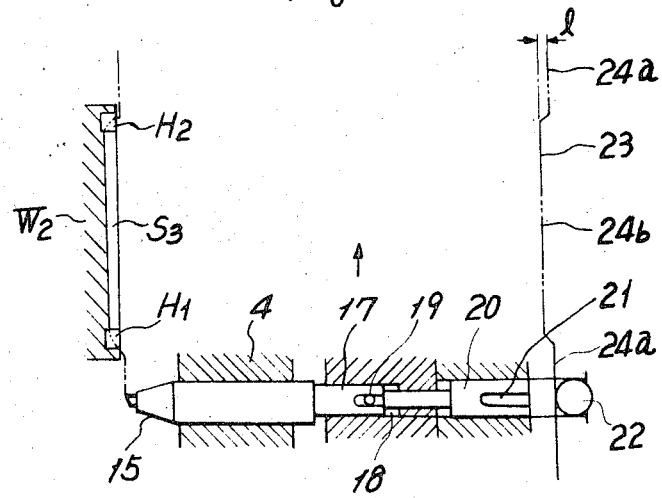
FIG. 6 is a cross-sectional view taken along the line VI—VI in FIG. 5.

Also, a plurality of pressing devices 60 are provided on the tool holder 4 constantly urging the cutting tools 15 and 16, respectively, toward the left as shown in FIGS. 5 and 6.

The pressing device 60 comprises a hydraulic cylinder 18 with a slidable piston 17 therein, the piston 17 being reciprocable within the hydraulic cylinder 18 but refrained from rotation by means of a detent pin 19, as viewed in FIG. 6.

The left portion of the slidable piston 17 is connected with the right end portion of each of the cutting tools 15 and 16, as shown in FIG. 5. Thus, the cutting tools 15 and 16 are always kept in the condition of being urged toward the left, FIG. 5, since fluid under pressure is constantly supplied into the right side or rear side of the hydraulic cylinder 18 through a passage 18a from a pressure source (not shown).

Furthermore, a circular cam plate 23 is fixedly mounted on the spindle head 2 at the right end of the tool holder 4, as shown in FIG. 5. The circular cam plate 23 is formed with the profile depicted in FIG. 6, having a prominent portion 24a and a recessed portion 24b thereon which control the machining operation for an arcuate groove S3 on a workpiece W2 to be formed. A slide member 20 is threadably connected with the right end of the slidable piston 17 to be axially moved in a supporting member 70 which is fixedly mounted on the spindle 3. There is rotatably supported a roller 22 on the right-hand end of the slide member 20; the roller being in contact with the cam plate 23 for co-operation therewith.

Consequently, while the cutting tools 15 and 16, which are being adapted to form the arcuate grooves on the workpiece in accordance with rotation of the tool holder 4, are advanced in regular sequence from the side surface of the tool holder 4 through a predetermined amount which is determined by the lift amount between the prominent portion 24a and the recessed portion 24b. Therefore, each of the cutting tools 15a and 15t is successively advanced to form arcuate groove S3 on the workpiece W2 in the rough machining operation, and thereafter, the cutting tool 16 serves to finish the same in the fine machining operation.

The cutting tools 15 and 16 are retracted through the lift amount against the urging pressure in the pressing device 60 when they enter into an escape hole H2, as shown in FIG. 6. The escape hole H2 is provided on the workpiece W2 at the place where the machining operation is finished. It is to be noted that the series of cutting tools 15a to 15t are gradually increased in the amount projected from the side surface of the tool holder 4 in the rotational direction thereof, in FIG. 2. The last cutting tool 15t is preset with a projected amount equal to the cutting depth required for the arcuate groove.

Detailed descriptions will now be made with regard to the constructure of the work head 27, with particular reference to FIG. 1.

A work spindle 28 is rotatably supported within the work head 27 through anti-friction bearings. On an enlarged cylindrical portion 28a of the work spindle 28, at the right end thereof, is fixedly mounted an index table 29 which is arranged to face the tool holder 4. Three supporting shafts 30 are rotatably journaled on the index table 29 at positions equally spaced 120° from each other, FIG. 2, to sustain three workpieces W1, W2 and W3 thereon, respectively. Three flanges F1, F2 and F3 with collet chucks 31 thereon for firmly clamping the workpieces W1, W2 and W3 are respectively provided on the right ends of supporting shafts 30 which are extended from the right side surface of the index table 29. The collet chuck 31 is hydraulically operated and is capable of clamping or releasing the workpiece from the flange.

The flanges F1, F2 and F3 are operably connected with the index table 29 by way of respective curvic couplings 32. Each curvic coupling 32 includes a pair of curvic coupling members 32a and 32b which are respectively provided with convex tooth surfaces and concave tooth surfaces to thereby meshingly engage with each other. The curvic coupling members 32a are respectively secured to the left side surfaces of the flanges F1, F2 and F3, while the curvic coupling members 32b are secured in the index table 29 opposite to the coupling members 32a. Thus, the curvic couplings 32 serve to index accurately and position positively the respective flanges F1, F2 and F3 and the workpieces W1, W2 and W3. The curvic couplings 32 may also be substituted by hirth couplings, not shown, which are adapted for attaining a similar aim corresponding thereto. The form of tooth surfaces generated on the coupling members of the hirth couplings are different from those of the curvic couplings 32 in that they have flat tooth surfaces.

An operating rod 33 is axially slidable within the work spindle 28 in axial alignment therewith, being refrained from rotation by being keyed to the work head 27. A disc plate 34 is rotatably mounted on the operating rod 33 at the right end thereof, FIG. 1, and the left end portions of the supporting shafts 30 are rotatably received within the disc plate 34. Fixedly attached to the extreme right end of the operating rod 33 is a sun gear 35 with which planetary gears 36a, 36b and 36c are meshingly engaged. The planetary gears are respectively secured on the supporting shafts 30. A gear ratio between the sun gear 35 and each of the planetary gears 36a, 36b and 36c is determined to be 4 to 3. An external geneva gear 37 is keyed to the work spindle 28 by means of a key 38, and is provided with six engaging grooves 37a which are recessed around the outer periphery thereof and equally spaced 60° from one another.

Moreover, a shaft 42 is rotatably carried in the lower portion of the work head 27 in parallel relationship with the work spindle 28. A drive disc 39 and a spur gear 41 are integrally formed and are fixedly mounted on the shaft 42. Four projection pins 40 which are provided on the drive disc 39 are equidistnatly spaced 90° from one another on the circumferential portion thereof. The spur gear 41 is meshed with a gear 43 which is fixedly secured to the synchronizing shaft 12. Shaft 12 is rotatable in synchronized relation to the rotation of the tool spindle 3 in the spindle head 2. The number of teeth on the gear 43 is equal to that of the spur gear 41, that is, the gear ratio 1 to 1. Therefore, when the drive disc 39 is rotated by an angle of 180° such that two projection pins 40 are engaged with and disengaged from the engaging grooves 37a, the geneva gear 37 is rotated by an angle of 120°. Accordingly, by rotation of the geneva gear 37, each of the workpieces W1 and W3 is revolved through an angle of 120° about the sun gear 35 and each is further rotated about its own axis through an angle of 160° which is determined by a gear ratio 4 to 3 between the sun gear 35 and each of the planetary gears 36a, 36b and 36c.

On the left end portion or rear portion of the operating rod 33 is secured a flange 48, and a compression spring 47 is interposed between the left end of the work spindle 28 and the flange 48 in order to urge the operating rod 33 toward the left, as shown in FIG. 1. While the operating rod 33 is being biased to the left by the compression spring 47, the curvic coupling member 32a, mounted on each of the flanges F1 to F3, is engaged with the coupling member 32b complementary thereto. At the same time, the supporting shafts 30 are prevented from rotation relative to the operating rod 33. A roller 49 is rotatably supported on the left end of the operating rod 33. A cam 50 is in contact with the roller 49 and is formed with a desirable contour in such a manner that the operating rod 33 may be shifted toward the right, FIG. 1, through the roller 49 before the projection pin 40 on the drive disc 39 is engaged with the engaging groove 37a of the geneva gear 37 in accordance with rotation of the synchronizing shaft 12.

Figure 2:
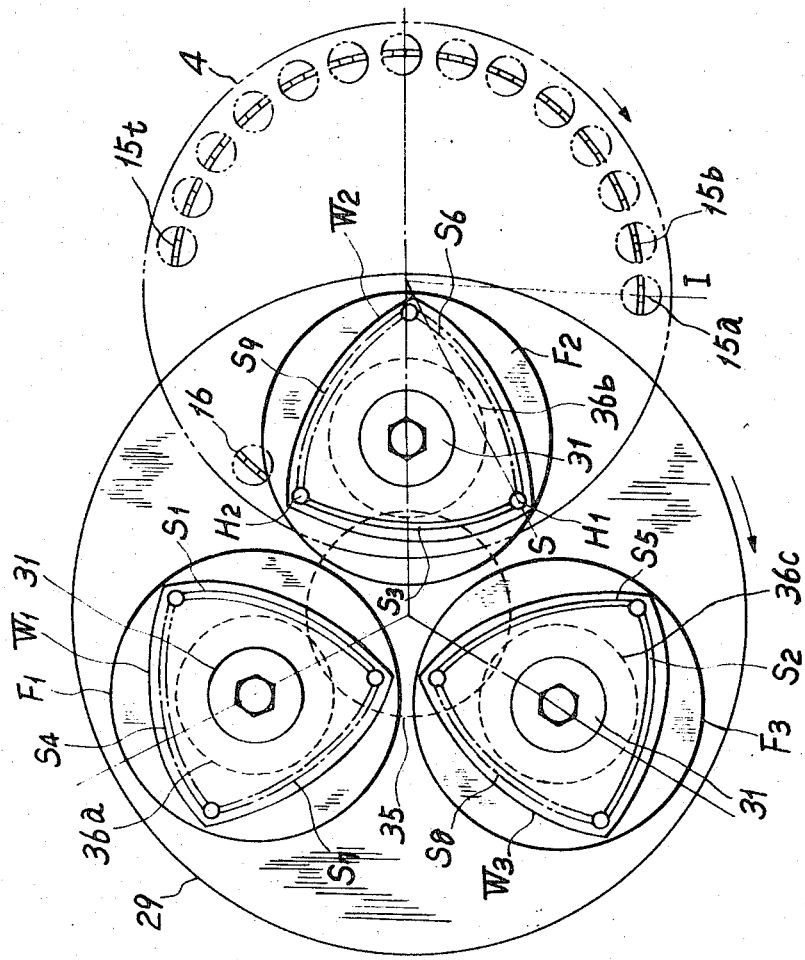
FIG. 2 is an end view on enlarged scale seen from the direction of an arrow II in FIG. 1.

Thus, the coupling member 32a is disengaged from the coupling member 32b through movement of the operating rod 33 between an initial position I, for initiating an indexing operation of the workpiece to be machined, and a start position S, for beginning a machining operation thereon, while the tool holder 4 is rotated by one revolution, as seen in FIG. 2.

The spur gear 53 is secured on the lower end of a shaft 80 which is rotatably journaled in the work head 27 so as to communicate the rotational motion thereof to the cam 50 which is fixedly mounted on the top end of the shaft, in FIG. 1. The spur gear 53 is meshingly engaged with a gear 52, the number of the teeth of the gear 52 being two times that of the gear 53. The gear 52 is operatively connected to the synchronizing shaft 12 through bevel gears 51. The number of teeth of each gear 51 being the same as the other.

Consequently, the workpieces W1 to W3 are simultaneously indexed, after the operating rod 33 is shifted toward the right, in FIG. 1, against the urging force of the compression spring 47 to thereby release engagement between the curvic coupling members 32a and 32b and make the supporting shafts 30 freely rotatable. The workpieces W1 to W3 are, therefore, revolved by 160° about the axis thereof when the tool holder 4 is rotated by one revolution or the synchronizing shaft 12 is rotated half a revolution.

A mechanical transmission mechanism for rotating the work spindle 28 in synchronism with the rotation of the tool spindle 3 is employed in the preferred embodiment. However, another driving device may also be applied to index the work spindle 28 in response to an electrical switch which generates a signal when the rotatable plate 7 is rotated through a predetermined amount. As shown in FIG. 1, an index plate 44 is fixedly attached on the index table 29 and formed with three notches which are equally separated from each other by an angle of 120°. A cylinder device 46 is mounted on the work head 27 in order to shiftably move a knock pin 45 which is engageable with one of three notches which are respectively associated with the workpieces W1 to W3. One of the workpiece is thus indexed into a machining position at which the outer edge thereof is parallel to a rotational path of the cutting tools 15 and 16.

The operation for a grooving machine tool according to the present invention will now be described starting the operation from the situation shown in FIG. 2. It is to be noted that FIG. 2 shows the situation in which the arcuate grooves S1 and S2 to be formed respectively on the workpiece W1 and W3 have been just completed and the arcuate groove S3 on the workpiece W2 has been completed shortly therebefore. The index table 29 is about to be indexed so that the workpiece W1 is brought to the machining position in order to form an arcuate groove S4 thereon. The arcuate grooves S5 and S9 have not been completed.

The spindle head 2 is advanced by the feeding device until the same is engaged with the fixed stop 26. Each of the cutting tools 15 and 16 is located at a retracted position, as illustrated in FIG. 6, as the roller 22 is contacted with the prominent portion 24a of the master cam 23. Also, the tool spindle 3 is being rotated by means of the drive motor 5.

An indexing operation for the workpieces W1 to W3 is effected while the first cutting tool 15a is being moved from the initial position I to the start position S. The procedure of the indexing operation for the workpieces W1 to W3 is now explained in detail. The knock pin 45 is disengaged from the notch of the index plate 44 by actuating the cylinder device 46. Thereafter, the external geneva gear 9 in the spindle head 2 is rotated by a predetermined angular amount of 60° in accordance with one revolution of the tool spindle 3. The geneva gear 37 is not rotated at the beginning of the rotation of the synchronizing shaft 12 because the projection pin 40 is not immediately engaged with the engaging groove 37a. The cam 50 is immediately rotated after the rotation of the synchronizing shaft 12 to shift the operating rod 33 toward the right, in FIG. 1. Therefore, all of the flanges F1 to F3 are disconnected from the index table 29 at the start of the rotation of the synchronizing shaft 12 because the curvic coupling member 32a and 32b are disengaged from each other.

Thereafter, the projection pin 40 is engaged with the engaging groove 37a. The geneva gear 37 in the work head 27 is therefore rotated by an angle of 120° when the drive disc 39 is rotated by a half revolution thereof through the synchronizing shaft 12 and the gear 43. At the conclusion of this operation, the work spindle 28 is rotated through the same angle in correspondence with the geneva gear 37 through the key 38, and each supporting shaft 30 is revolved on the axis thereof through the angle of 160° according to the gear ratio between each of the planetary gears 36a to 36c and the sun gear 35. When the workpiece W1 is indexed into the machining position, the supporting shaft 30 is rotated about the sun gear 35 and about the axis thereof, thereby positioning the arcuate groove S4 to be formed thereon into the rotational path of the cutting tools 15 and 16. Of course, the other workpieces W2 and W3 are also rotated by the angle of 120° about the sun gear 35 and revolved by the angle of 160° around the axis thereof due to the gear ratio between each of the planetary gears 36b, 36c and the sun gear 35.

Subsequently, when the arcuate groove to be formed on the workpiece W1 has been brought into the machining position, the projection pin 40 is disengaged from the engaging groove 37a. Therefore, rotation of the work spindle 28 is stoped but the rotation of the cam 50 is continued such that the operating rod 33 is moved toward the left by means of the compression spring 47. By this movement of the operating rod 33, the supporting shaft 30 is simultaneously moved toward the left, in FIG. 1, whereby the curvic coupling members 32a and 32b are engaged with each other to precisely position the respective workpieces W1 to W3 on the index table 29 in the respective index positions thereof. Thereafter the index table 29 is positively locked to the work head 27, being refrained from rotation by the insertion of the knock pin 45 into the notch of the index plate 44.

At this time, the cutting tool 15a, equipped on the tool holder 4, is located in close proximity to the machining position in accordance with rotation of the tool spindle 3. That is, the tool 15a is placed at the start position S as viewed in FIG. 2. Thereafter, the roller 22 comes into abutment with the recessed portion 24b of the master cam 23. When the cutting tool 15a is brought into alignment with the escape hole H1, the roller 22 is engaged with the inclined surface 24c of the cam 23 and the tool 15a is urged toward hole H1 by the pressurized fluid introduced into the cylinder 18 of the pressing device 60. Subsequently, the cutting tool 15a is adapted to be fed toward the workpiece by the amount of the cutting depth for the cutting tool 15a, as soon as the roller 22 is engaged with the recessed portion 24b of the cam 23. When the cutting tool 15a reaches the escape hole H2, it is withdrawn from the hole since the roller 22 is contacted by the inclined surface 24c and thereafter, with the prominent portion 24a of the cam 23.

Similarly, the cutting tools 15b to 15t, which are gradually and slightly increased with respect to the amount fed into the workpiece, are sequentially passed through the workpiece W1 so that the arcuate groove S4 may be formed with the predetermined cutting depth in accordance with rotation of the tool holder 4. Thus, the rough machining operation for the arcuate groove S4 is finished, and thereafter, the required machining cycle is accomplished by effecting the fine machining operation by means of the cutting tool 16.

In a similar manner, the index operations and the machining operations are performed on the workpieces W1 to W3 so as to form all the arcuate grooves thereon.

Obviously, many modifications and variations of the present invention are possible in the light of the above teachings. It is to be understood, therefore, that within the scope of the appended claims, the invention may be practiced otherwise than as specifically described herein.

What is claimed as new and desired to be secured by Letters Patent of the United States is:

1. A machine tool for forming arcuate grooves on a plurality of workpieces comprising:
   a base;
   a work head provided on said base;
   a spindle head slidably mounted on said base and movable toward and away from said work head;
   a work spindle rotatably mounted in said work head;
   a tool spindle rotatably supported in said spindle head;
   a tool holder fixedly mounted on said tool spindle at the end thereof and having a series of cutting tools around the peripheral portion thereof;
   an index table secured to one end of said work spindle and including means mounted thereon for supporting said workpieces for rotation about their axes;
   indexing means provided for simultaneously turning each of the workpieces around the axis thereof and around the axis of said work spindle through respective predetermind amounts so as to sequentially index the workpieces into a machining position; and synchronizing means for actuating said indexing means in accordance with the rotation of said tool spindle.

2. A machine tool according to claim 1, which further comprises:
   control means for successively projecting said series of cutting tools a predetermined amount from said tool holder so as to machine said workpiece indexed into the machining position by said indexing means.

3. A machine tool according to claim 1, wherein said means for supporting said workpieces comprises a plurality of supporting shafts and wherein said indexing means comprises:
   an operating rod movable in an axial direction thereof, but refrained from rotation in said work spindle;
   said plurality of supporting shafts being rotatably mounted on said index table for supporting said workpieces and being rotatably connected to said operating rod;
   gear train means for connecting said operating rod and each of said supporting shafts;
   locking means provided between said index table and said respective supporting shafts for establishing a connection therebetween; and
   shifting means actuated by said synchronizing means for releasably moving said locking means so as to allow relative rotation between said supporting shaft and said index table.

4. A machine tool according to claim 2, wherein said control means comprises;
   pressing means mounted on said tool holder for successively advancing said series of cutting tools toward said workpiece indexed into the machining position; and
   regulating means for determining the advancing position of said cutting tools in accordance with the rotation of said tool holder.

5. A machine according to claim 1, in which said synchronizing means comprises:

a first geneva mechanism including a disc plate which is operably connected with said tool spindle and has a projection pin thereon, and a geneva gear engageable therewith and provided parallel with said tool spindle for transmitting the rotation of said disc plate through a predetermined angular amount thereof;

first gearing means operably connected with said geneva gear within said base;

a synchronizing shaft member journaled within said bed in parallel relation to said tool spindle in order to permit said spindle head to slide longitudinally on said base and connected with said first gearing means at the one end thereof;

a second geneva mechanism provided with a geneva gear which is operably connected with said work spindle and a drive disc having a projection pin to rotate said index table by a predetermined angular amount through said geneva gear; and second gearing means operably connected with said second geneva mechanism for transmitting to the same the rotation thereof at the other end of said synchronizing shaft member.

6. A machine tool according to claim 1, wherein said indexing means further comprises a cylinder device which is provided with a knock pin for engaging the same with notch means on said work spindle when said workpiece to be machined is indexed into the machining position.

7. A machine tool according to claim 3, in which said shifting means comprises:

pushing means provided within said work head for axially biasing said operating rod so as to lock said workpieces to said index table; and a cam member formed with a predetermined contour thereon and contacted with said operating rod for moving axially the same against the biasing force of said pushing means through transmitting gear means operatively rotated in accordance with the rotation of said synchronizing means.

8. A machine tool according to claim 4, wherein said pressing means comprises:

a main body;

a cylinder formed in said main body;

a piston slidably mounted in said cylinder and integrally connected with each of said cutting tools;

a passage for leading a fluid under pressure into said cylinder; and a detent pin fixed in said main body for preventing the rotational movement of said piston.

9. A machine tool according to claim 4, wherein said regulating means comprises:

a master cam mounted on said spindle head and formed with a predetermined profile thereon, a supporting member fixedly mounted on said tool spindle;

a slide member slidably received in said supporting member to be operably connected with said pressing means, and provided with a roller which is rotatably carried thereon and abutted with said master cam to travel along the profile thereof.

10. A machine tool according to claim 7, wherein said pushing means comprises spring means interposed between said work spindle and a flange which is fixedly mounted on said operating rod.

* * * * *